United States Patent Office 3,446,902
Patented May 27, 1969

3,446,902
ELECTRODE HAVING OXYGEN JETS TO ENHANCE PERFORMANCE AND ARC STARTING AND STABILIZING MEANS
Ronald R. Akers, Pittsburgh, Pa., assignor to Westinghouse Electric Corporation, Pittsburgh, Pa., a corporation of Pennsylvania
Filed Jan. 8, 1968, Ser. No. 696,358
Int. Cl. H05b 7/08
U.S. Cl. 13—18                                         6 Claims

ABSTRACT OF THE DISCLOSURE

An electrode of the type having a fluid cooled annular tip with a field coil disposed therein for setting up a magnetic field to substantially continuously move the arc over the arcing surface of the tip has means for exhausting oxygen under pressure at a plurality of points disposed around the electrode to produce oxygen jets. The oxygen jets result in the electrode producing a hole in the scrap or melt of larger diameter than would otherwise be produced, since the oxidation of iron ore or scrap is essentially an exothermic reaction. The larger hole reduces the probability that material from the scrap above the electrode tip will fall down into the hole, producing a short circuit between the side of the electrode tip and the melt. Additionally, an oxygen jet through the central opening of the annular tip assists in the reduction and melting of the ore, and eliminates the formation of stubs.

CROSS REFERENCES TO RELATED APPLICATIONS

The electrode described herein is a further development of and/or improvement over the electrode described in a copending application for "Electric Arc Furnace and Non-Consumable Electrode for Use Therein," by A. M. Bruning, Ser. No. 407,332, filed Oct. 29, 1964, and assigned to the assignee of the instant invention.

BACKGROUND OF THE INVENTION

Field of the invention

The invention relates to non-consumable electrodes which have a fluid cooled electrode tip with means for conducting heat flux from the tip so rapidly by transferring the heat flux to the fluid that no substantial evaporation of material occurs from the electrode tip and the electrode tip is cooled at such a rapid rate that the intensely hot arc spot does not produce a burn through. In addition a magnetic field coil disposed within the tip rotates the arc substantially continuously in a substantially circular path around the annular tip reducing the dwell time of the arc spot on any particular area of the surface of the tip.

DESCRIPTION OF THE PRIOR ART

Electrodes of the general type described in connection with the field of the invention are old in the art. Where prior art electrodes are used for melting iron ore or scrap, it has been found in practice that as the electrode is lowered into the scrap the electrode gradually produces a hole in the scrap of not much larger diameter than that of the electrode itself, and it has been found that material from the scrap sometimes falls down into the hole producing a short circuit between the electrode tip and the scrap, which is usually the surface of opposite polarity to which the arc takes place in normal operation. Generally speaking, it has been found that in scrap melting furnaces, the hole formed by the electrode during the melting down process was smaller than was desirable, and this can lead to a number of difficulties, one of which appears to be the shorting of the magnetic field through the iron surrounding the hole; a second problem is that if the hole formed is small, an insufficient amount of molten metal is formed in the bottom of the furnace. As a result, once the electrode reaches the furnace bottom it overheats a local portion of the metal, which could lead to failure of the furnace.

My invention overcomes the problems associated with prior art electrodes by increasing the size or diameter of the cavity or hole formed by the electrode as it passes through the scrap, by blowing oxygen on the surface of the metal wall of the hole while the metal is still hot from the arcing process. Since the oxidation of iron is an exothermic process, by burning part of the steel additional steel is melted in a ratio of approximately 5:1. The hole produced by the electrode can therefore be enlarged to a desired size or diameter depending on the rate of flow of oxygen to the rate of melting of the steel by the arc. The oxygen is exhausted through bores or tubes or orifices in the lower electrode wall, which communicate with a manifold or manifolds within the electrode. This oxygen jet process also increases the amount of metal accumulated at the bottom of the furnace, and helps to overcome the second problem mentioned hereinabove. If an insufficient amount of metal has been melted to collapse the surrounding scrap, additional oxygen is admitted. Since the automatic regulation of the position of the electrode maintains the electrode at a constant location or level, the oxygen continues to melt the walls of the cavity until the scrap collapses.

Another difficulty encountered by prior art electrodes is that of a "stub" developing in the cavity, to which the arc attaches, and which causes the arc to cease to rotate. The uniform melting of the scrap is enhanced by blowing oxygen through the center opening of the annular tip, or along the outside of the electrode tip. Oxygen may be so admitted only when the stub problem is encountered, and during the remainder of the time air may be admitted to keep the hole open. Additionally, when a "stub" is encountered the arc may be shut off, the electrode maintained in position, and oxygen admitted and used to burn the stub away.

This blowing of oxygen or other gas through the central aperture of the annular tip has the additional features of helping to keep the arc confined to the electrode tip arcing furnace, preventing the arc from entering the central opening or arcing to the outside wall of the electrode. In practice gases other than oxygen may be used to help confine the arc to the electrode arcing surface.

Oxygen is superior to combustion flames for the above processes since it does not create a path of high conductivity for the arc to follow, which might result in rapid erosion of the electrode. The oxygen burns only upon contact with the molten steel or iron, and therefore offers a high resistance path.

Additionally, the admission of oxygen into the furnace through the electrode provides great ease in performing additional processing of steel which requires oxygen or some other gas, such as to either develop an inert atmosphere either in the entire furnace or locally within the arcing region. In my electrode the admission of oxygen or other gases is easily accomplished by simple manifolding inside the electrode. The electrode is adequately cooled to allow the oxygen to pass through holes or tubes in the electrode wall or column. During the period when oxygen is not required, air may be admitted through the holes or tubes at a low rate to keep the holes open and to conserve oxygen.

SUMMARY OF THE INVENTION

A non-consumable electrode has inlet means and header means extending around the entire electrode preferably just above the electrode tip, and a plurality of peripherally spaced bores or tubes for producing oxygen jets from the outside wall of the electrode, the jets extending either transverse to the axis of the electrode at angles of 90 degrees or less or parallel to said axis. Additionally, oxygen inlet means and manifolding means is provided in the central aperture of the electrode tip for producing an oxygen jet or jets in the tip area. The inlet means and the manifolding means may be used for the admission of air or some gas to produce an inert atmosphere. Additionally, gas for producing a combustion flame at the tip for arc starting or arc stabilization is part of my invention.

BRIEF DESCRIPTION OF THE DRAWINGS

An electrode according to my invention is shown in FIGS. 1A and 1B, the electrode of FIG. 1A having gas jets around the outside near the tip, the jets being exhausted at an angle with respect to the axis, the electrode of FIGURE 1B showing jets both at an angle of less than 90° with respect to the axis and perpendicular to the axis of the electrode.

DESCRIPTION OF THE PREFERRED EMBODIMENT

Figure 1A:
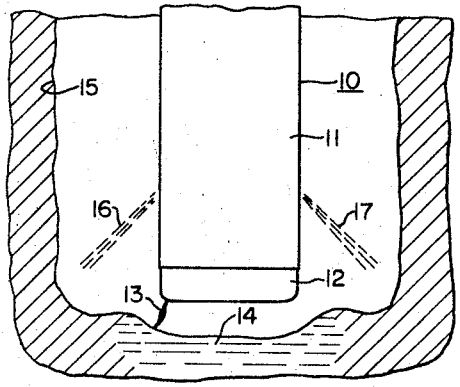

In FIG. 1A, jets 16 and 17 are shown extending from the outside wall of column 11 of electrode 10 having tip 12 with arc 13 to melt 14, producing hole 15 in the scrap.

Figure 1B:
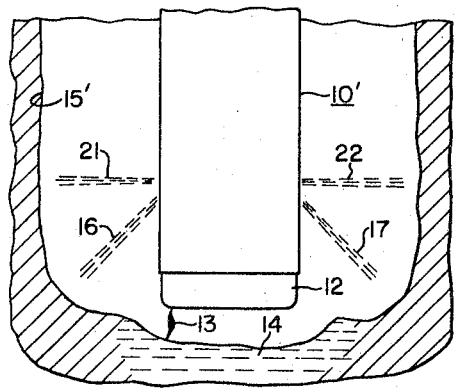

In FIG. 1B, additional jets 21 and 22 are shown from electrode 10' producing hole 15'.

Figure 2:
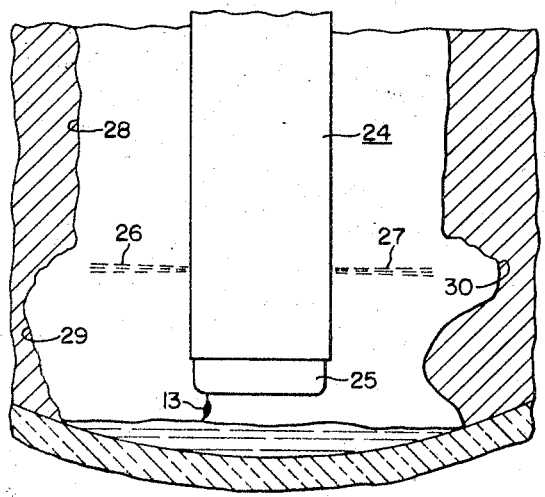
FIG. 2 shows an electrode having only peripherally spaced jets of oxygen or other gas issuing from the outside wall near the tip, the jets extending transverse to the axis of the electrode.

In FIG. 2, laterally extending jets 26 and 27 from electrode 24 having tip 25 with arc 13 therefrom produce hole 28 having portions of enlarged diameter 29 and 30.

Figure 3:
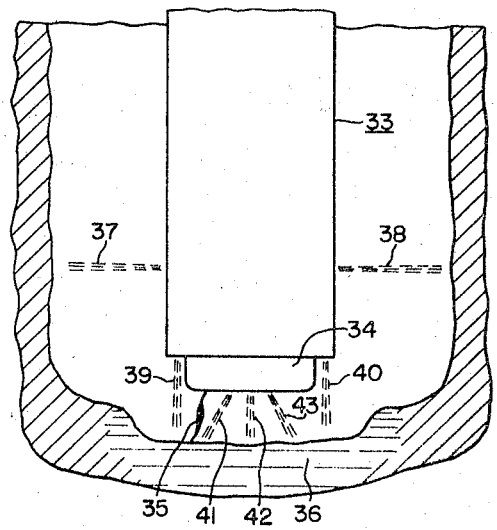
FIG. 3 shows peripherally spaced jets around the tip extending downwardly from the column of the electrode, as well as jets extending through the central opening of the annular electrode tip.

Particular reference is made now to FIGURE 3 where the electrode 33 has a tip 34 with an arc 35 to melt 36, and the electrode is seen as having a plurality of peripherally spaced radially extending jets from the column wall just above the top, two of the jets being shown at 37 and 38, and in addition the electrode 33 has jets peripherally spaced around the tip extending toward the melt in a direction substantially parallel to the axis of the electrode, two of these jets being shown at 39 and 40. Additionally, jets of oxygen come from the center aperture of the annular tip, three of these jets being shown at 41, 42 and 43.

In these and all other embodiments of my invention, it is understood that the electrode includes means forming a conductive path to the tip, said means being connected to one terminal of a source of potential, not shown for convenience of illustration, and that the other terminal of the source is electrically connected to the melt which is at least to a degree electrically conductive.

Figure 5:
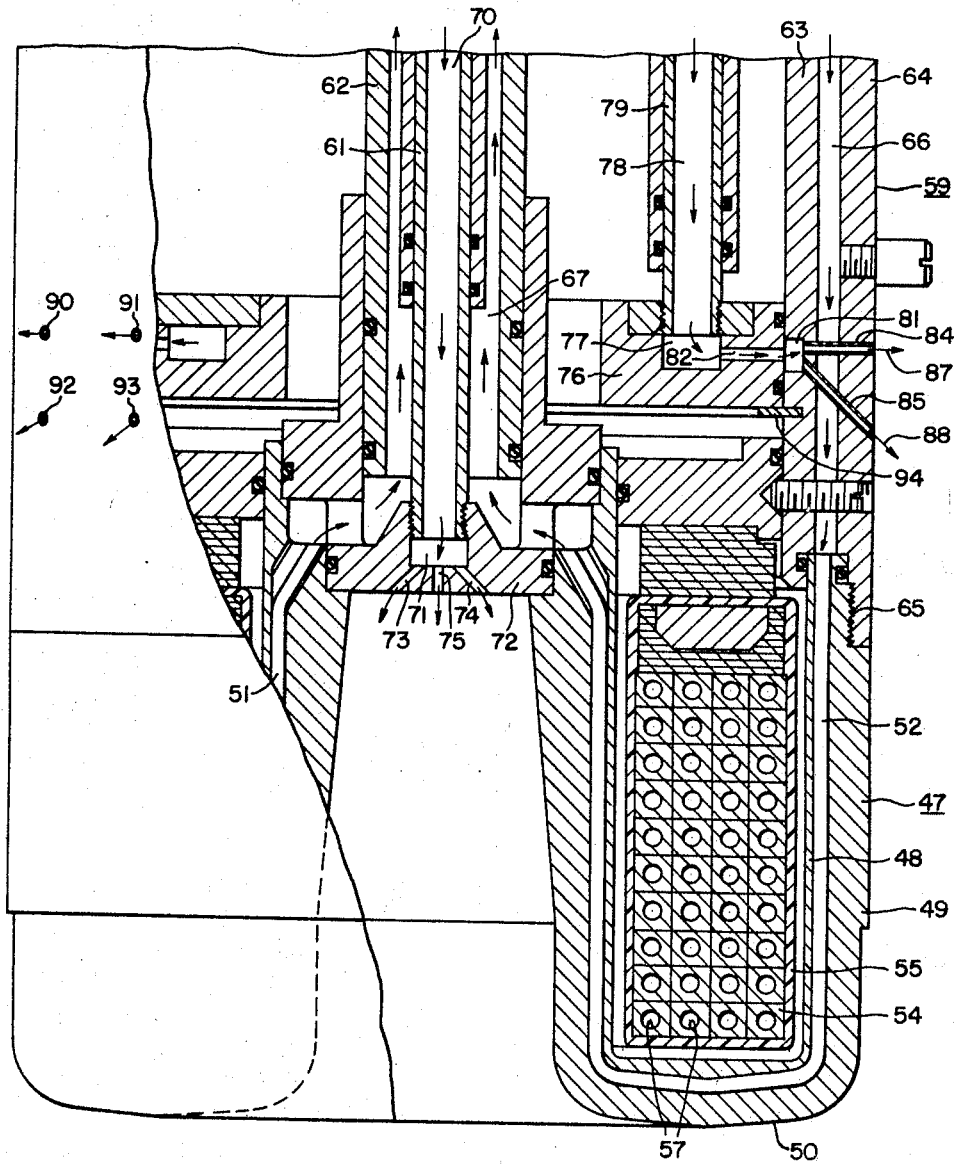
FIG. 5, largely in section, show my electrode according to another embodiment thereof.

Particular reference is made now to FIG. 5, a fragmentary view partially in section and partially in side elevation of an electrode embodying by invention. The electrode is generally of the type which has an annular generally U-shaped tip 47 composed of material having high thermal and electrical conductivity, the tip generally designated 47 having inner and outer annular cup-shaped shells 48 and 49 respectively with a plurality of peripherally spaced generally U-shaped passageways between the inner shell and the outer shell for the flowing of cooling fluid to conduct heat flux away from the arcing surface, two of these passageways being shown at 51 and 52, the arcing surface being designated 50. The peripherally spaced U-shaped passageways for the flow of cooling fluid constitute no part of the instant invention, being described in a copending application of S. M. DeCorso and C. B. Wolf for "Electrode and Electrode Tip for Use Therein," Ser. No. 440,425, filed Mar. 17, 1965, and assigned to the assignee of the instant invention.

Also in accordance with prior art practice my electrode contains a field coil disposed within the annular space of the cup-shaped electrode tip, the field coil being shown at 54 enclosed within an insulating housing 55. Field coil 54 is shown as consisting of a plurality of turns of hollow conduit having passageways 57 for the flow of cooling fluid, it being understood that any convenient insulated conduits may pass through the electrode supporting column for forming electrical inlet and outlet connections to the field coil and for bringing fluid to and from the field coil, such a practice being old in the art.

The tip supporting means includes a supporting column for the electrode tip, which is seen to include four coaxially mounted tubes of graduated diameters 61, 62, 63 and 64. The use of a plurality of coaxially disposed cylinders or tubes in an electrode supporting assembly or column is old in the art, being described in the copending application of S. M. DeCorso and C. B. Wolf, for "No-Consumable Arc Electrode," Ser. No. 407,327, filed Oct. 29, 1964, and assigned to the assignee of the instant invention.

It is seen that the tip generally designated 47 is threaded to the lower end of the tube or cylinder 64 of largest diameter by threads 65. Fluid for cooling the tip flows down passageway 66 between tubes 63 and 64 and after flowing around the tip exits through passageway 67 between tubes 61 and 62. The passageway 70 formed in tube 61 brings oxygen or other gas, which may be air, or may be gas selected to produce an inert atmosphere in the furnace, to header 71 in member 72, which may be considered part of the tip supporting means, which has a plurality of peripherally spaced bores therein at an oblique angle to the axis of the tube 61, two of the bores being shown at 73 and 74, and in addition has an axially extending bore 75. Jets from these bores including 73, 74 and 75 assist in melting the portion of the melt directly underneath the electrode, for as previously explained, the oxidation of iron ore and steel is an exothermic process, and the jets further assist in eliminating a stub or stubs at the arc location, as previously explained. Further, these jets assist in positioning the arc.

Disposed inside the aforementioned tube 63 is an annular ring member 76 having an annular gas header 77 therein which extends around the entire electrode, gas header 77 being fed with oxygen or other gas by passageway 78 formed by tube 79 which it is understood extends through the supporting column assembly of the electrode and connects with a gas source above. It is seen that there are a plurality of smaller or minor gas headers at peripherally spaced intervals in the wall of tube 63, one of these headers being shown at 81 communicating with main header 77 by bore 82. Header 81 can be a continuous annular header if desired extending around the entire electrode. From header 81 tubes 84 and 85 pass through the axially extending support tube 63, annular passageway 66 and outer sleeve or tube 64, to produce a transverse jet 87 and an additional jet 88 at an oblique angle to the wall of the electrode. On the left-hand side of the figure, additional tube openings are shown, openings 90 and 91 producing jets transverse to the axis of the electrode, openings 92 and 93 producing jets at an angle less than 90° to the axis at the electrode.

A number of O-rings are seen inside the electrode, being disposed at desirable positions to provide fluid-tight seals. In addition a retaining ring 94 is seen seated in a groove in the inside wall of the tube 63 and maintaining the ring or header member 76 in axial position within the electrode structure.

Any suitable means, not shown for convenience of illustration, may be employed for maintaining the various parts of the electrode in their desired positions with respect to each other.

Figure 4:
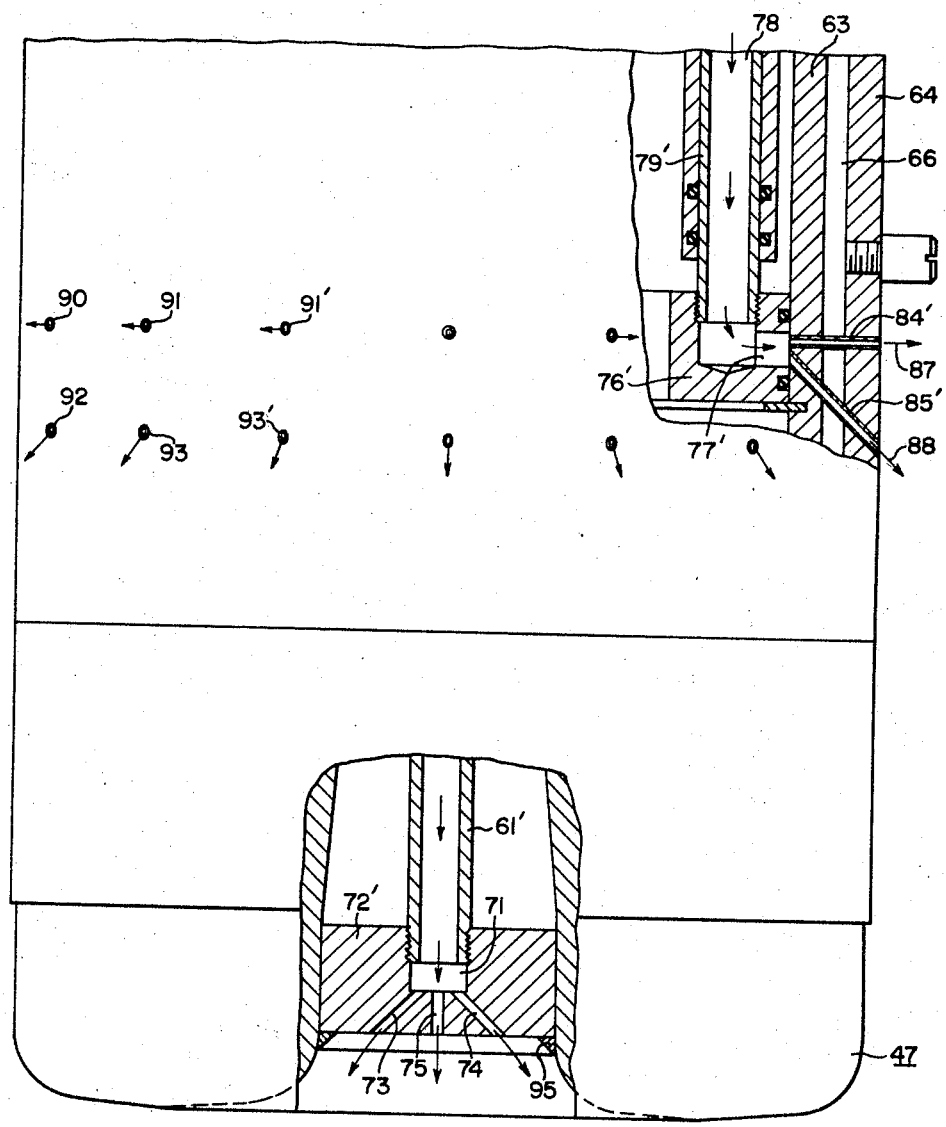
FIG. 4, a side elevational view partially broken away, shows my invention according to one embodiment thereof which can be used for producing an oxygen jet or jets or for producing a combustion flame.

Particular reference is made now to FIGURE 4, a modification of the electrode invention of FIGURE 5. In FIGURE 4 tube 61' extends to a member 72' disposed much nearer the end of the electrode tip than the member 72 of FIG. 5. Member 72' which may be considered part of the tip supporting means has header 71 with passageways 73, 74 and 75 as before, and member 72' may be secured to the tip 47 as by brazing at 95, or member 72' may be fluid cooled by the same fluid which cools the electrode tip, O-ring seals being provided where needed. The fragmentary section of the portion of the electrode for producing jets from the outside wall of the electrode near the tip shows an annular ring member 76' within tube 63, with a header 77' which it is understood extends around the entire electrode, having tubes 84' and 85' communicating therewith to produce the aforementioned transverse and oblique jets 87 and 88 of oxygen, air or other gas.

As previously stated, my invention provides means for starting the arc, or restarting the arc if it goes out, without forcing the electrode, by regulator or other means, into direct contact with the irregular arcing surface of the melt. It is desirable to avoid starting the arc by direct contact because as the electrode is drawn away from the melt surface there exists a point at which the magnetic field is not capable of rotating a very short arc and the electrode is eroded.

I provide one or more continuous (or temporary) combustion flames from the electrode which impinges at least in part on both the arcing surface of the electrode tip and the melt, forming a high temperature low resistance path along which the arc can reignite. This not only allows from simple arc reignition during the normal running period, but is also extremely useful for initial start up of the arc upon cold scrap.

If desired, small amounts of seeding agents may be added to the gas which produces the flame, to increase the ionization and conductivity.

In producing a combustion flame, I locate the jet where the gas stream will graze the electrode tip. In FIG. 4, gas coming from bores 73 and 74 would graze tip 47.

If desired, acetylene or natural gas may be employed.

Member 72' is electrically insulated from the tip, by means not shown for convenience of illustration.

If desired, chamber 71 may form a mixing chamber, so that oxygen and another gas are separately brought to the chamber to avoid a combustible mixture flowing through the electrode, one gas reaching chamber 71 by path 61', the other by similar means, not shown for convenience of illustration.

The combustion gas may follow a path similar to jets 39 and 40 of FIG. 3 so long as the path brushes the electrode tip and the arc is transferred from the combustion path to the tip.

Other structural embodiments of my invention can be used to produce the combustion flame.

My invention and the apparatus embodying it is suitable for use in the process of melting iron ore or scrap in which a combustion flame is first used to reduce the ore or scrap to a molten condition and an electric arc thereafter employed to bring the molten metal to the desired temperature.

In both FIGURES 4 and 5, fluid flow passageway 66 instead of being cylindrical in shape may be peripherally spaced axially extending bores, so that the gas forming the jets passes through bores in one integral member including what is now shown separately as 63 and 64, the jet bores being spaced between the axially extending bores, obviating the necessity for tubes.

The aforegoing written description and the drawings are illustrative and exemplary only and not to be interpreted in a limiting sense.

I claim as my invention:

1. An electrode for melting scrap composed at least partially of conductive material comprising in combination, a supporting column having fluid, flow passageways formed therein, a fluid cooled tip secured thereto fed from said fluid flow passageways and at a high potential with respect to the scrap, the arc extending in a direction substantially parallel to the axis of the electrode and extending between the arcing surface of the tip and the adjacent surface of the scrap underneath, magnetic field coil means mounted within the electrode and setting up a magnetic field at the arcing surface transverse to the arc path whereby the arc is caused to move substantially continuously in a substantially repetitive path around the arcing surface the electrode being adapted to be lowered through the molten scrap as a molten pool of metal forms near the bottom of the scrap to maintain an optimum arc length and arc power, means in the supporting column for conducting oxygen to a position therein near the tip, and means in the supporting column receiving oxygen from the oxygen conducting means for producing a plurality of nonconducting oxygen jets at peripherally spaced intervals around the supporting column, all said jets impinging upon the molten metal surrounding the electrode and producing combustion of said last named metal.

2. An electrode for melting scrap composed at least partially of conductive material comprising in combination, a supporting column and an electrode tip secured thereto and forming an arcing surface, the supporting column including a cylinder of conductive material forming an outer wall for the supporting column and being adapted to be connected to one terminal of a source of potential to bring current to the tip to produce and sustain an arc from the tip to the scrap which forms a surface of opposite polarity, said cylinder being at the same potential as the tip, the electrode being normally positioned whereby the distance between the tip and the metal underneath represents the shortest arc path and the arc path of lowest resistance whereby the arc normally extends from the tip in a direction substantially parallel to the longitudinal axis of the electrode, magnetic field coil means mounted within the electrode and setting up a magnetic field at the arcing surface transverse to the arc path whereby the arc is caused to move substantially continuously in a substantially repetitive path around the arcing surface the electrode being adapted to be lowered through the molten scrap as a molten pool of metal forms near the bottom of the scrap to maintain optimum arc length and arc power and electrode efficiency, means in the supporting column for conducting oxygen to a position therein near the tip, and means in the supporting column receiving oxygen from the oxygen conducting means for producing a plurality of nonconductive oxygen jets at peripherally spaced intervals around the cylinder of conductive material forming the outer wall of the supporting column, said jets extending transverse to the longitudinal axis of the electrode, all said jets impinging upon the molten metal surrounding the electrode and producing combustion of said last named metal, said combustion increasing the diameter of the passageway through the scrap formed by passage of the electrode and forming a hole in the scrap substantially greater in diameter than the diameter of said cylinder thereby reducing the probability that a piece of scrap may fall into the hole and short out the arc by forming a conductive path from said cylinder to the scrap surrounding the cylinder.

3. An electrode for melting scrap composed at least partially of conductive material comprising in combination a fluid cooled electrode tip at a high potential with respect to the scrap, elongated supporting means including fluid channeling means for the tip, the arc extending in a direction substantially parallel to the longitudinal axis of the electrode and extending between the tip and the adjacent surface of the scrap underneath, magnetic field coil means mounted within the electrode and setting up a magnetic field at the arcing surface transverse to the arc path whereby the arc is caused to move substantially continuously in a substantially repetitive path around the arcing surface, the electrode being adapted to be lowered through the scrap as a molten pool forms near the bottom of the scrap to maintain an optimum arc length and power, means in the electrode for conducting oxygen to the tip, the tip including means fed from the oxygen conducting means for producing at least one nonconducting oxygen jet from the tip which impinges upon the molten metal underneath and causes combustion of said last named metal.

4. In an electrode for melting scrap composed at least partially of conductive material, the electrode including an annular tip forming an arcing surface and a supporting column at least a portion of which is conductive electrically connected to the tip and adapted to be electrically connected to one terminal of a source of potential having the other terminal connected to the scrap, the tip being generally annular in shape with an annular space inside, a magnetic field coil mounted in said space, the arc between the electrode tip and the scrap normally extending between the tip to the scrap underneath the tip and normally extending in a direction parallel to the longitudinal axis of the electrode, the magnetic field coil setting up a field at the arcing surface transverse to the path of the arc and exerting a force on the arc which causes the arc to move substantially continuously in a substantially annular path around the arcing surface, a member closing the central aperture of the annular electrode tip, said member having a plurality of slanting passageways therethrough, means in the electrode column for conducting oxygen to the member and exhausting said oxygen through said slanting passageways to form a plurality of oxygen jets, said slanting passageways slanting at predetermined angles whereby the jets pass near the arcing surface of the tip but do not substantially impinge thereon and impinge on the molten metal underneath the tip at a plurality of points in the circular path of the arc on a pool of molten scrap, the oxygen in said oxygen jets burning only upon contact with the molten metal and tending to burn away any stubs extending from the molten pool to which the arm might become fixed and cease to rotate by reason of a shortened arc path of low resistance formed between the stub and the arcing surface.

5. A nonconsumable electrode having a supporting column and an electrode tip secured thereto forming an arcing surface, the supporting column being composed at least partially of conductive material adapted to be connected to a terminal of one polarity of a source of potential to supply current to the tip and produce an arc therefrom to a surface of opposite polarity, said arc normally extending in a direction parallel to the axis of the electrode, the electrode tip being generally annular in shape and U-shaped in cross section with an outside wall of large diameter relative to an inside wall of small diameter, the tip having a fluid flow passageway therein extending around the entire tip near the bottom and inside and outside walls, the tip having an annular space therein, a magnetic field coil mounted in said annular space and adapted when energized to set up a magnetic field at the arcing surface having at least a large component transverse to the arc path whereby a force is exerted on the arc which tends to move the arc substantially continuously in an annular path around the arcing surface, a closure member closing the central opening of the annular tip, the closure member having a gas passageway therethrough, the electrode supporting column having a tube passing therethrough for bringing gas to the gas passageway in the closure member and at least one other tube passing therethrough for forming a fluid flow connection with one end of the passageway in the tip, the supporting column including means for forming another fluid flow passageway therein forming a fluid flow connection with the other end of the passageway in the tip.

6. A nonconsumable electrode having a supporting column and an electrode tip secured thereto forming an arcing surface, the supporting column being composed at least partially of conductive material adapted to be connected to a terminal of one polarity of a source of potential to supply current to the tip and produce an arc therefrom to a surface of opposite polarity, said arc normally extending in a direction parallel to the axis of the electrode, the electrode tip being generally annular in shape and U-shaped in cross section with an outside wall of large diameter relative to an inside wall of small diameter, the tip having a fluid flow passageway therein extending around the entire tip near the bottom and inside and outside walls, a magnetic field coil mounted in said annular space and when energized setting up a magnetic field at the arcing surface having at least a large component transverse to the arc path whereby a force is exerted on the arc which tends to move the arc substantially continuously in an annular path around the arcing surface, a plurality of peripherally spaced gas passageways in the wall of the supporting column, gas heater means communicating with all said gas passageways, the electrode supporting column having a tube passing therethrough for bringing gas to the gas heater means and at least one other tube passing therethrough for forming a fluid flow connection with one end of the passageway in the tip, the supporting column including means forming another fluid flow passageway therein forming a fluid flow connection with the other end of the passageway in the tip.

References Cited

UNITED STATES PATENTS

| 430,453 | 6/1890 | Willson | 75—10 |
| 2,052,796 | 9/1936 | Rava | 219—75 |
| 3,147,329 | 9/1964 | Gage | 13—9 |
| 3,194,941 | 7/1965 | Baird | 219—121 |
| 3,204,075 | 8/1965 | Browning. | |
| 3,334,885 | 8/1967 | Taylor | 239—132.3 |

BERNARD A. GILHEANY, *Primary Examiner.*

H. B. GILSON, *Assistant Examiner.*

U.S. Cl. X.R.

13—9